US012710010B2

(12) United States Patent
Gore

(10) Patent No.: US 12,710,010 B2
(45) Date of Patent: Aug. 18, 2026

(54) INTEGRATED POWER AND COOLING SYSTEM

(71) Applicant: Rolls-Royce North American Technologies Inc., Indianapolis, IN (US)

(72) Inventor: Patrick Gore, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 19/087,419

(22) Filed: Mar. 21, 2025

(65) Prior Publication Data

US 2025/0215828 A1 Jul. 3, 2025

Related U.S. Application Data

(63) Continuation of application No. 18/377,643, filed on Oct. 6, 2023, now Pat. No. 12,281,615.

(51) Int. Cl.
*F02C 7/18* (2006.01)
*F02C 7/22* (2006.01)
*F02C 7/224* (2006.01)

(52) U.S. Cl.
CPC ................. *F02C 7/18* (2013.01); *F02C 7/22* (2013.01); *F02C 7/224* (2013.01); *F05D 2260/232* (2013.01)

(58) Field of Classification Search
CPC ...... F02C 3/22; F02C 7/18; F02C 7/22; F02C 7/224; F05D 2260/205; F05D 2260/207; F05D 2260/232
See application file for complete search history.

(56) References Cited

U.S. PATENT DOCUMENTS

| | | | | |
|---|---|---|---|---|
| 9,765,691 | B2 | 9/2017 | Delgado | |
| 12,281,615 | B1 * | 4/2025 | Gore | F02C 7/16 |
| 2019/0056154 | A1 | 2/2019 | Jansen et al. | |
| 2020/0088098 | A1 * | 3/2020 | Roberge | F02C 7/16 |

(Continued)

OTHER PUBLICATIONS

Memon, How Jet Fuel Is Routed Within Aircraft Engines, Nov. 14, 2022, Simple Flying, https://simpleflying.com/how-jet-fuel-is-routed-within-aircraft-engines/#heating, 7 pages.

(Continued)

*Primary Examiner* — Scott J Walthour
(74) *Attorney, Agent, or Firm* — Barnes & Thornburg

(57) ABSTRACT

A system includes a hydrogen fuel delivery system for an engine that pumps hydrogen from a tank in a liquid state and an evaporator configured to convert at least some of the hydrogen to a gaseous state. The system includes a heat source thermally coupled with the system and fluidly uncoupled from the system. The system is configured to supply the hydrogen to the engine for combustion and cool the heat source using the hydrogen. The system further includes a coolant loop that circulates coolant between the heat source and the evaporator. The coolant loops includes a valve that splits the coolant flowing from the evaporator into a first portion that flows to a heater and a second portion that flows to the heat source. The first and second portions are directed to the evaporator after having passed through the heater and the heat source.

18 Claims, 5 Drawing Sheets

(56) References Cited

U.S. PATENT DOCUMENTS

| | | | |
|---|---|---|---|
| 2020/0088099 | A1 | 3/2020 | Roberge |
| 2022/0194622 | A1 | 6/2022 | Rambo |
| 2022/0364513 | A1 | 11/2022 | Muldoon |

OTHER PUBLICATIONS

Kellermann, et al., Assessment of fuel as alternative heat sink for future aircraft, online date Jan. 25, 2020, Applied Thermal Engineering, ScienceDirect, 11 pages.

NASA, Liquid Hydrogen As A Propulsion Fuel, 1954-1959, Part II: 1950-1957, Library of Congress Cataloging in Publication Data (1978), 36 pages.

Coutinho, et al., A review on the recent developments in thermal management systems for hybrid-electric aircraft, Applied Thermal Engineering 227 (2023), online date Mar. 23, 2023, 21 pages.

* cited by examiner

INTEGRATED POWER AND COOLING SYSTEM

CROSS-REFERENCE TO RELATED APPLICATIONS

This application is a continuation application of co-pending U.S. patent application Ser. No. 18/377,643, which was filed on Oct. 6, 2023. The disclosure the above-identified patent application is incorporated herein by reference in its entirety.

TECHNICAL FIELD

This disclosure relates to a cooling system for a heat source and, in particular, to a cooling system that uses liquid hydrogen as both a power generation fuel source and a heat sink.

BACKGROUND

Thermal management systems, and in particular cooling systems used to reduce the temperature of a larger assembly, are well known. Typically, in known cooling systems, heat is redirected from the larger assembly by the cooling system and rejected to the ambient air to which the cooling system is in thermal communication. However, these ambient air cooling systems often are large in size, weight, and cost due to the requirement of incorporating large heat exchangers to communicate between the cooling system's working fluid and the ambient air. In addition, the performance and efficiency of these ambient air cooling systems are directly impacted by the size and temperature differentials between the working fluid and the ambient air, which may be relatively small. In order to boost performance, these known ambient air cooling systems often are forced to incorporate a fan or other means of motivating air flow across the heat exchangers, thereby further complicating the design and requiring additional energy expenditure for the designed heat rejection. The present application presents several embodiments which address these deficiencies.

SUMMARY

According to a first aspect of the present disclosure, a system includes a hydrogen fuel delivery system for an engine, the hydrogen fuel delivery system comprising a pump configured to pump hydrogen from a tank storing the hydrogen in a liquid state through the hydrogen fuel delivery system, and an evaporator configured to convert at least some of the hydrogen in the liquid state to a gaseous state, a heat source thermally coupled with the hydrogen fuel delivery system and fluidly uncoupled from the hydrogen fuel delivery system, and a coolant loop configured to circulate a coolant between the heat source and the evaporator to cool the heat source, the coolant flows directly from the heat source to the evaporator, and heat from the heat source is transferred from the coolant to the hydrogen in the evaporator.

In some embodiments, the hydrogen fuel delivery system is configured to supply the hydrogen to the engine for combustion and cool the heat source using the hydrogen, the coolant loop includes a first valve that splits the coolant flowing from the evaporator into a first portion that flows to a heater and a second portion that flows to the heat source, and the first and second portions are directed to the evaporator after having passed through the heater and the heat source, respectively.

In some embodiments, the coolant loop is configured such that the first portion of the coolant that has been heated by the heater bypasses the heat source and flows directly to the evaporator and the coolant exiting the heat source bypasses the heater and flows directly to the heat source.

In some embodiments, the coolant loop further includes a first fluid line along which the evaporator and the heat source are arranged and a second fluid line along which the heater is arranged, and the coolant loop further includes a first connector that fluidically couples the second fluid line to the first fluid line downstream of the heat source.

In some embodiments, the first and second portions of the coolant flow through the first connector after exiting the heater and the heat source, respectively, such that the first and second portions both flow through the first fluid line to the evaporator after passing through the first connector.

In some embodiments, the pump comprises a first pump, and the coolant loop comprises a second pump configured to pump the coolant between the evaporator and the heat source.

In some embodiments, the system further includes a metering valve arranged between the pump and the evaporator and configured to regulate a flow of the hydrogen in the liquid state to the evaporator.

In some embodiments, the metering valve is controlled based on at least one of a sensed pressure and a sensed temperature of the hydrogen output from the evaporator.

In some embodiments, the pump is configured to pump a first portion of the hydrogen in the liquid state to the evaporator, and is further configured to pump a second portion of the hydrogen in the liquid state to at least one auxiliary component to cool the at least one auxiliary component.

In some embodiments, the system further includes a connector configured to combine the first portion of the hydrogen from the evaporator and the second portion of the hydrogen from the at least one auxiliary component, and supply the first portion and the second portion downstream to the engine.

According to a further aspect of the present disclosure, a system includes a hydrogen fuel delivery system for an engine, the hydrogen fuel delivery system comprising a pump configured to pump hydrogen from a tank storing the hydrogen in a liquid state through the hydrogen fuel delivery system, and an evaporator configured to convert at least some of the hydrogen in the liquid state to a gaseous state, a heat source thermally coupled with the hydrogen fuel delivery system and fluidly uncoupled from the hydrogen fuel delivery system, and at least one component positioned downstream from the evaporator between the evaporator and the engine and configured to raise a temperature of the hydrogen before the hydrogen reaches the engine. The hydrogen fuel delivery system can be configured to supply the hydrogen to the engine for combustion and cool the heat source using the hydrogen.

In some embodiments, the at least one component comprises at least one of an oil cooler and a preheater.

In some embodiments, the pump is configured to deliver a first portion of the hydrogen in the liquid state directly to the at least one component.

In some embodiments, a second portion of the hydrogen in the liquid state different from the first portion is directed to the evaporator after having passed through the pump.

In some embodiments, the system further includes a first connector arranged downstream of the first pump and configured to receive the hydrogen in the liquid state therefrom. The first connector can splits the hydrogen in the liquid state into the first portion that flows to the at least one component and into the second portion that flows to the evaporator.

In some embodiments, the first connector further splits the hydrogen in the liquid state into a third portion that flows to at least one auxiliary component to cool the at least one auxiliary component.

In some embodiments, the system further includes a first metering valve arranged between the first connector and the evaporator and configured to regulate a flow of the hydrogen in the liquid state to the evaporator.

In some embodiments, the system further includes a second metering valve arranged between the first connector and the at least one component and configured to regulate a flow of the hydrogen in the liquid state to the at least one component.

In some embodiments, the hydrogen in the evaporator functions as a direct heat sink for the heat source.

In some embodiments, the system further includes an auxiliary cooling system configured to cool the heat source when the engine is not operating.

According to a further aspect of the present disclosure, a hydrogen cooling method includes delivering, with a hydrogen fuel delivery system, hydrogen from a tank storing the hydrogen in a liquid state to an engine that uses the hydrogen in a gaseous state as fuel, converting at least some of the hydrogen in the liquid state to the gaseous state with an evaporator during the delivery of the hydrogen to the engine, cooling a heat source using the hydrogen during the delivery of the hydrogen to the engine, the heat source electrically powered by the engine when the engine is burning the hydrogen to operate, circulating a coolant via a coolant loop between the heat source and the evaporator to cool the heat source, the coolant flows directly from the heat source to the evaporator, and heat from the heat source is transferred from the coolant to the hydrogen in the evaporator, and splitting the coolant flowing from the evaporator via a first valve of the coolant loop into a first portion that flows to a heater and a second portion that flows to the heat source, the first and second portions are directed to the evaporator after having passed through the heater and the heat source, respectively.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

The present description describes systems, apparatuses, and methods related to use of hydrogen as both a power generation fuel source for an engine and a heat sink for a heat source.

Figure 1:
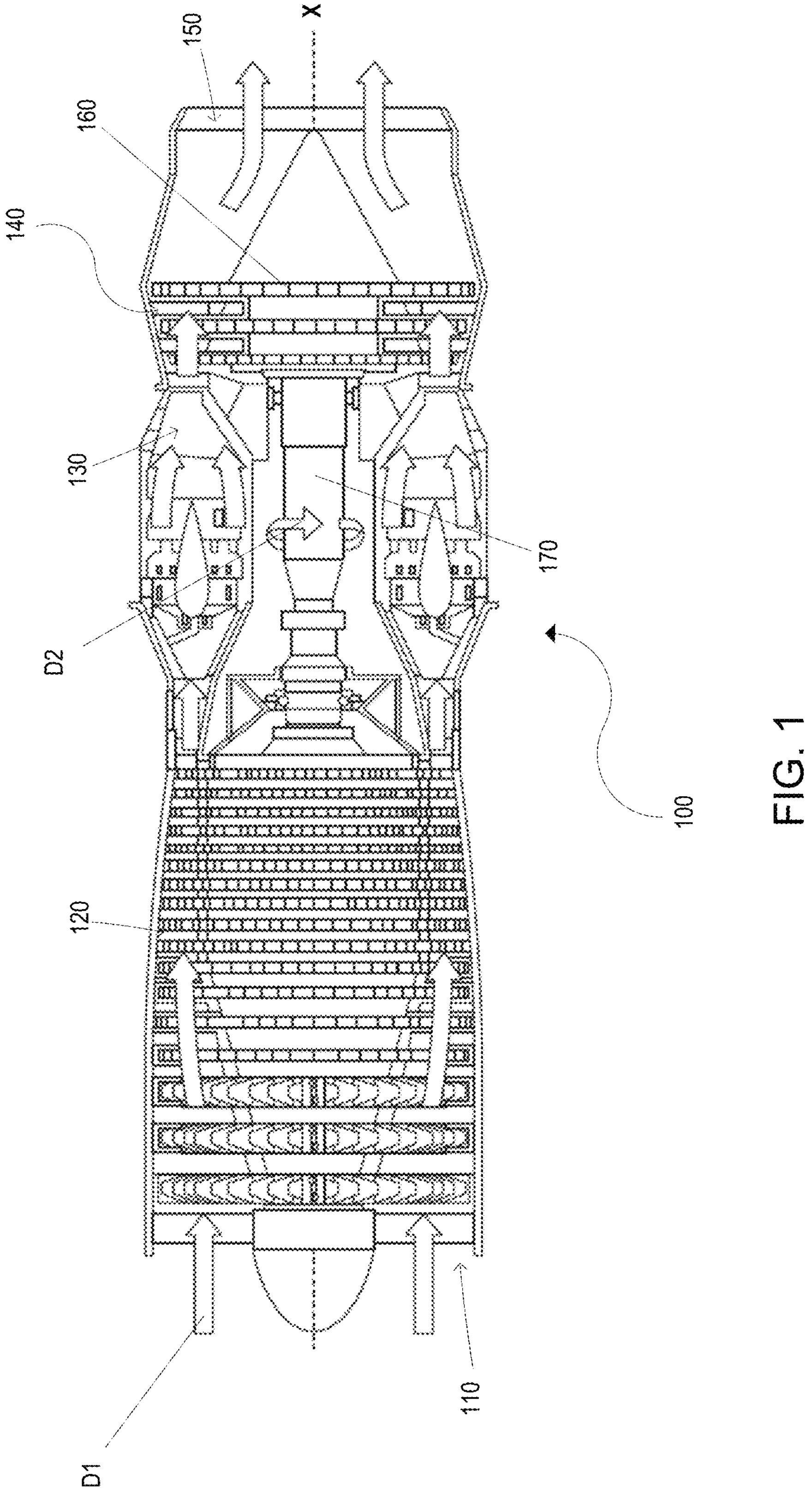
FIG. 1 is a cross-sectional view of an example gas turbine engine.

FIG. 1 is a cross-sectional view of a gas turbine engine 100, which is representative of an example engine for the embodiments described herein that use hydrogen as fuel. In some examples, the gas turbine engine 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. In addition, the gas turbine engine 100 may be utilized in a configuration unrelated to an aircraft such as, but not limited to, an industrial application, an energy application, a power plant, a pumping set, a marine application (for example, for naval propulsion), a weapon system, a security system, a perimeter defense or security system.

The gas turbine engine 100 may take a variety of forms in various embodiments. For example, in some forms the gas turbine engine 100 may have one or multiple spools and/or may be any form of axial flow engine or mixed centrifugal/axial flow engine. In addition or alternatively, in some forms, the gas turbine engine 100 may be a turboprop, a turbofan, a turboshaft engine, an auxiliary power unit (APU), a generator set, or other turbomachinery application. Furthermore, the gas turbine engine 100 may be an adaptive cycle and/or a variable cycle engine. Other variations are also contemplated.

The gas turbine engine 100 may include an intake section 110, a compressor section 120, a combustion section 130, a turbine section 140, and an exhaust section 150. During operation of the gas turbine engine 100, fluid received from the intake section 110, such as air, travels along the direction D1 and may be compressed within the compressor section 120. The compressed fluid may then be mixed with fuel and the mixture may be burned in the combustion section 130. The combustion section 130 may include any suitable fuel injection and combustion mechanisms. The hot, high pressure fluid may then pass through the turbine section 140. As the hot, high pressure fluid passes through the turbine section 140, the fluid passes between adjacent blades 160, extracting energy from the fluid and causing the blades 160 to rotate around an axis of rotation corresponding to a centerline X of the turbine section 140. The rotation of the blades 160 turns a shaft 170 in a rotational direction D2, which in turn drives the compressor section 120. Discharge fluid may exit the exhaust section 150.

Figure 2:
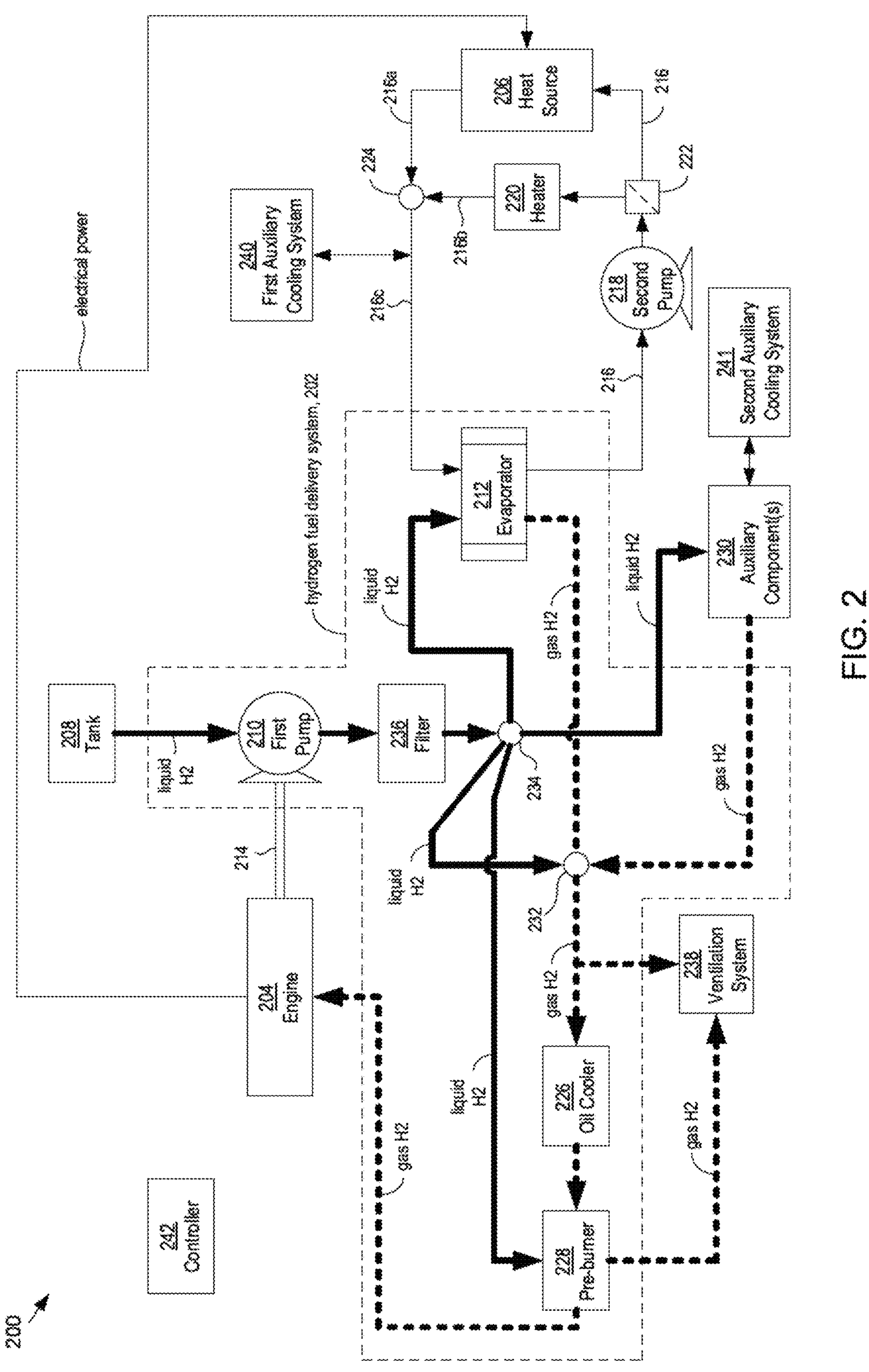
FIG. 2 is a schematic block diagram of an example system implementing a hydrogen fuel delivery system for an engine that is also configured to cool a heat source.

FIG. 2 shows a schematic block diagram of a system 200 that includes a hydrogen fuel delivery system 202 for an engine 204 that also functions as a cooling system for a heat source 206. In general, the engine 204 uses hydrogen as fuel to produce or generate mechanical energy. For example, the engine 204 may be configured to burn gaseous hydrogen in order to produce the mechanical energy. In at least some implementations, the engine 204 is a gas turbine engine or otherwise has a combustor to burn the hydrogen fuel. For example, the engine 204 may be, or otherwise have the configuration of, the gas turbine engine 100 of FIG. 1, although other engine configurations for the engine 204 may be possible.

The hydrogen fuel delivery system 202 is configured to deliver or supply hydrogen as fuel to the engine 204 for combustion. The hydrogen fuel delivery system 202 may include, or otherwise be coupled to a tank 208 storing or containing the hydrogen in a liquid state. In some implementations, the liquid hydrogen may be stored in the tank 208 at a temperature of −253 degrees Celsius (20 degrees Kelvin) or lower.

In addition, the hydrogen fuel delivery system 202 may include a first pump 210 and an evaporator 212. The first pump 210 is configured to pump the liquid hydrogen out of the tank 208 for delivery of the hydrogen through the hydrogen fuel delivery system 202. For some implementations, such as shown in FIG. 2, the first pump 210 is powered by the engine 204. For example, a shaft or other rotatable component 214 of the engine 204 may be configured to rotate gears or other rotatable components of the first pump 210 to cause the first pump 210 to operate. In an alternative example, the engine 204 supplies electrical power to the first pump 210, such as via a generator in order to power the first pump 210. In another alternative example, electrical power is supplied to the first pump 210 from another power source such as a battery. In this way, the first pump 210 pumps the hydrogen that will eventually be used by the engine 204 to power the first pump 210. Also, in some implementations, the first pump 210 is a component of a fuel pump and metering unit (FPMU) (not shown) that controls the flow of the hydrogen through the hydrogen fuel delivery system 202.

The evaporator 212 is configured to receive the liquid hydrogen from the first pump 210, and convert at least some of the hydrogen in the liquid state to a gaseous state. That is, in the evaporator 212, at least some of the liquid hydrogen undergoes a phase change in which the hydrogen changes from a liquid to a gas. In some implementations, the hydrogen output from the evaporator 212 is entirely in a gaseous state. In other implementations, the hydrogen output from the evaporator 212 is a mixture of gas and liquid. That is, a portion of the hydrogen output from the evaporator 212 has undergone a phase change to gas, while another portion is still in liquid form. As shown in FIG. 2, the hydrogen output from the evaporator 212 is supplied or delivered to the engine 204.

Also, in FIG. 2, bold arrows are used to highlight the flow of hydrogen through the hydrogen fuel delivery system 202. Solid bold arrows are used to show parts of the flow path in the hydrogen fuel delivery system 202 where the hydrogen is in its liquid state or at least before it has passed through a component (e.g., the evaporator 212) where it is intended to perform a phase change to gas. Additionally, dotted bold arrows are used to show parts of the flow path of the hydrogen fuel delivery system 202 where the hydrogen is in its gaseous state or at least after it has passed through a component (e.g., the evaporator 212) where it is intended to perform a phase change to gas.

In addition, the heat source 206 is generally a device, a machine, an apparatus, an object, or an assembly of devices, machines, apparatuses, and/or objects, configured to generate, output, and/or radiate heat. The heat source 206 may be a component in the system 200 that is cooled so that its temperature is maintained within a target or desired temperature range, or so that it is otherwise prevented from reaching too hot of temperature levels that can cause the heat source 206 to operate sub-optimally or inefficiently and/or to become damaged or destroyed.

In the system 200, the heat source 206 is thermally coupled with the hydrogen fuel delivery system 202, such that the heat source 206 may be cooled using the hydrogen in the hydrogen fuel delivery system 202. In general, the hydrogen passing through the hydrogen fuel delivery system 202 is much colder than the temperature of the heat source 206. For example, the hydrogen in liquid form is colder than −253 degrees Celsius (20 degrees Kelvin), whereas the heat source 206 may reach temperatures on the order of tens, hundreds, or thousands of degrees Celsius while operating. Due to the large temperature differential, the hydrogen functions as a heat sink, absorbing heat from the heat source 206. For at least some implementations, the liquid hydrogen in the evaporator 212 absorbs at least some of the heat from the heat source 206.

In addition, for at least some implementations, while being thermally coupled to the hydrogen fuel delivery system 202, the heat source 206 is fluidly uncoupled from the hydrogen fuel delivery system 202. That is, while the heat source 206 may affect or influence the temperature of the hydrogen through its thermal coupling, the hydrogen does not flow through the heat source 206, or the heat source 206 is otherwise not involved in the transport or delivery of the hydrogen from the tank 208 to the engine 204.

In addition or alternatively, for at least some implementations, the heat source 206 is configured to perform an intended function that is not used for the operation of the engine 204. To illustrate, in some examples, the heat source 206 includes a laser diode with an intended function of emitting laser light. The emission of the laser light, and the laser light itself, is not used to operate the engine 204.

In some implementations, the heat source 206 may include an electronic device having electrical circuitry that consumes electrical power in order to operate. The electrical circuitry may include active components (e.g., semiconductors such as transistors and/or diodes) and/or passive components (e.g., resistors). The electrical circuitry may generate heat when operating. The electrical circuitry may also include one or more circuit boards or other substrates on or in which the circuit components are mounted or otherwise integrated. In particular of these implementations, the electrical circuitry includes one or more laser diodes or other electrical circuitry configured to emit laser light.

In addition or alternatively, the heat source 206 may include a heat load. In any of various implementations, the heat load may be in the form of a heat exchanger, such as a cold plate for example. The heat load may be in thermal communication, or in thermally conductive contact, with another component (e.g., electrical circuitry) of the heat source 206. The other component may be a component of the heat source 206 that actually generates the heat, which is then transferred to the heat load. In some implementations, the heat source 206 includes both the heat-generating component and the heat load. In other implementations, the heat source 206 includes only the heat-generating component. In still other implementations, the heat source 206 includes only the heat load.

In addition or alternatively, the heat source 206 is configured to generate heat during operation, such as when the heat source 206 is operating to perform an intended function. Also, during operation, the heat source 206 may operate at an operating temperature. In some implementations, the operating temperature may be in a range of about 15-50 degrees Celsius, although other temperature ranges, including those higher than 50 degrees Celsius may be possible for other implementations.

In addition or alternatively, the heat source 206 may consume or require a relatively large amount of power (such as on the order of kiloWatts (kW)) and require a commensurate amount of cooling in order to maintain a desired operating temperature. For example, the heat source 206 may demand or require at least about 3 kiloWatts of electrical power (kWe) and at least about 2 kiloWatts of thermal cooling (kWt) for every 1 kilowatt of output optical power (kWo). In addition or alternatively, the heat source 206 may require a power and energy dense powerplant to supply it power, and/or a power and energy dense coolant system to remove the heat it generates.

In addition or alternatively, in some implementations, the heat source 206 may increase or ramp up its temperature to within a target operating temperature range, such as within a predetermined time period, in order to perform an intended function. For example, in some implementations, the heat source 206 includes a laser system, such as a cryogenic laser system, that heats up to a temperature within a target temperature range within a predetermined time period in order to emit laser light.

In addition or alternatively, in some implementations, the heat source 206 may generate heat intermittently. For example, the heat source 206 is "on" for a first time period during which the heat source 206 operates to perform an intended function, and then is "off" for a subsequent, second time period during which the heat source 206 is not operating to perform the intended function. During this "off" time period, the heat source 206 may recover, recharge, and/or regenerate so that it can operate to perform its intended function during another "on" time period. That is, the heat source 206 may dissipate heat it generates while operating during the "on" time periods, such as in order to maintain its operating temperature within, or otherwise to not exceed, the target operating temperature range during operation. In addition or alternatively, the heat source 206 may dissipate heat it generates during the "off" time periods as part of its recharging, recovery, and/or regeneration.

In addition or alternatively, the heat source 206 may be, or function as, one or more electrical loads. For example, the heat source 206 may include electrical circuitry that consumes electrical power, as previously described. In some implementations, the heat source 206 may demand relatively large power and relatively large heat rejection loads (e.g., on the order of 500 kiloWatts (kW) of electrical and thermal power) when operating (i.e., during its "on" time periods), and demand relatively small power and relatively small heat rejection loads (e.g., 10 kW) when not operating (i.e., during its "off" time periods). Non-limiting examples of the heat source 206, as an electrical load or otherwise, may include at least one of: one or more laser diodes, a directed energy weapon system (such as a high power laser system, a high power microwave system, and/or a high power millimeter wave system), a flight computer system, a navigation and communication system, a radar system, a hazard detection/avoidance system, a flight control surface positioning system, a landing gear system, a cabin environmental control system, a security system, a perimeter defense or other security system, and/or any other electrical system employed by an aircraft or other vehicle or by a system other than an aircraft, such as a power plant for example.

In addition, for at least some implementations such as in FIG. 2, the engine 204 is configured to generate energy that is used to power the heat source 206. For example, the engine 204 may be in the form of a genset or be otherwise coupled to a generator (not shown) that converts the mechanical energy generated by the engine 204 to electrical power that is supplied to the heat source 206, which the heat source 206 consumes in order to operate. In this way, the engine 204 generates energy to power the heat source 206, which is cooled with the hydrogen fuel that the engine 204 burns to generate the energy.

As described, the liquid hydrogen may function as a heat sink for the heat source 206. In the system 200, the liquid hydrogen particularly functions as an indirect heat sink or coolant for the heat source 206. In such implementations, a coolant, different or separate from the liquid hydrogen, is used to cool the heat source 206. For example, heat generated by the heat source 206 is initially transferred to, or absorbed by, the coolant, and then the heat is transferred from the coolant to, or absorbed by, the liquid hydrogen in the hydrogen fuel delivery system 202, such as in the evaporator 212. In some embodiments, where the heat source 206 includes a heat exchanger (e.g., a cold plate), heat may be transferred from a component that actually generates the heat (e.g., electrical circuitry) to the heat exchanger, and the heat is then transferred from the heat exchanger to the coolant. Non-limiting examples of the coolant may include, but are not limited to: carbon dioxide, anhydrous ammonia, a halomethane, a haloalkane, a hydrofluorocarbon (HFC), chlorofluorocarbons (CFC), a hydrochlorofluorocarbon (HCFC), any two-phase refrigerants (e.g., R134a), $CO_2$, water, a glycol, a glycol water mixture, an oil, and/or nanofluid.

As shown in FIG. 2, the system 200 includes a coolant loop 216 that circulates the coolant between the heat source 206 and the evaporator 212. The coolant loop 216 may include a second pump 218 that circulates the coolant between the heat source 206 and the evaporator 212.

In some implementations, the coolant loop 216 may include a heater 220 configured to heat the coolant. In at least some of these implementations, the heater 220 may be used to accelerate an amount of time taken for the coolant to reach a certain predetermined temperature, such as upon startup, which in turn may accelerate an amount of time taken for the heat source 206 to reach a predetermined operating temperature. Without the heater 220, the heat source 206 may take longer than desired to reach the predetermined operating temperature. This may be particularly the case where the heat source 206 is deployed in colder climates or other cold start conditions. Accordingly, the heater 220 may be activated to heat the coolant, which in turn may accelerate or shorten the time the heat source 206 takes to reach the predetermined operating temperature. Also, in some implementations such as shown in FIG. 2, the heater 220 may be connected in parallel with the heat source 206, such that the coolant may be supplied alternatingly to either the heat source 206 or the heater 220, or concurrently to the heat source 206 and the heater 220. As shown in FIG. 2, the coolant loop 216 may include a three-way valve 222, or other similar valves or routing components, that alternatingly or concurrently routes the coolant from the second pump 218 to the heat source 206 and the heater 220. Also, in some implementations such as shown in FIG. 2, the coolant loop 216 may include a first connector 224 coupling parts 216*a*, 216*b* of the coolant loop 216 supplying coolant from the heat source 206 and the heater 220 to a single line 216*c* delivering the coolant to the evaporator 212. Other implementations may locate the heater 220 in parallel with the evaporator 212.

Other implementations may not include the heater 220. For at least some of these other implementations, heat from the engine 204, such as from the engine oil or the engine casing, may be used to otherwise heat the coolant.

Additionally, in some implementations, the system 200 may include one or more components fluidly positioned downstream from the evaporator 212 and/or between the evaporator 212 and the engine 204. The one or more components positioned downstream from the evaporator 212 may condition the gaseous hydrogen, such as by further increasing its temperature, before the gaseous hydrogen reaches the engine 204. The increased temperature of the hydrogen may, in turn, increase or boost performance of the engine 204, since the hotter the temperature of the hydrogen fuel the more work the engine 204 may output. Alternatively, engine performance or efficiency may be increased in that the increased temperature of the hydrogen fuel may allow the flow rate of the hydrogen fuel to decrease without lowering the amount of work that the engine 204 outputs.

In some implementations, the one or more downstream components may include an oil cooler 226 configured to raise a temperature of the gaseous hydrogen before reaching the engine 204. In addition or alternatively, the one or more components may include a pre-heater or pre-burner 228 configured to heat the hydrogen to ensure gaseous hydrogen is supplied to the engine 204. Additional or alternative components positioned downstream from the evaporator 212 are possible. For example, a second evaporator may replace the oil cooler 226, or may be included with the oil cooler 226 as part of the one or more components positioned downstream from the evaporator 212.

In addition, in some implementations, the first pump 210 may be configured to pump liquid hydrogen to one or more other components besides or in addition to the evaporator 212. For example, the first pump 210 may be configured to pump the liquid hydrogen to one or more auxiliary components 230. Non-limiting examples of the one or more auxiliary components 230 may include one or more additional evaporators, one or more generators (e.g., a superconducting generator), and/or other electronics. As indicated in FIG. 2, the auxiliary component(s) 230 may utilize their own waste heat to convert liquid hydrogen to gaseous hydrogen. Correspondingly, the auxiliary component(s) 230 may be cooled using the liquid hydrogen as a coolant therefore. In this context, the hydrogen fuel serves as a heat sink for the auxiliary component(s) 230 in addition to the heat source 206. In some implementations, the heat source 206 and the auxiliary component(s) 230 comprise all of the heat loads of the system 200, in which case the hydrogen fuel may serve as a heat sink for all of the heat loads of the system 200.

Also, for at least some implementations including the auxiliary component(s) 230, part of the gaseous hydrogen used to fuel the engine 204 may be from part of the liquid hydrogen heated by the heat source 206, and another part of the gaseous hydrogen used to fuel the engine 204 may be from another part of the liquid hydrogen heated by the auxiliary component(s) 230. As shown in FIG. 2, the system 200 may include a second connector 232 configured to receive and combine together a portion of the gaseous hydrogen from the evaporator 212 and a portion of the gaseous hydrogen from the auxiliary component(s) 230. The second connector 232 may output the combined gaseous hydrogen toward the engine 204, such as to the oil cooler 226.

As described, in some implementations such as shown in FIG. 2, the oil cooler 226 is positioned downstream from the evaporator 212. In this configuration, the oil cooler 226 receives the gaseous hydrogen from the evaporator 212. Otherwise stated, the evaporator 212 and the oil cooler 226 are part of the same flow path for the hydrogen. In other implementations, the oil cooler 226 is part of the auxiliary component(s) 230, and in turn, is positioned in parallel with the evaporator 212. As such, for these other implementations, the oil cooler 226 does not receive the gaseous hydrogen from the evaporator 212, and the evaporator 212 and the oil cooler 226 are part of different flow paths of the hydrogen. Positioning the oil cooler 226 downstream from the evaporator 212 so that the evaporator 212 and the oil cooler 226 share the same flow of hydrogen, as in the implementation shown in FIG. 2, may provide the hydrogen fuel with greater overall cooling capacity, compared to the other implementation where the oil cooler 226 is part of the auxiliary component(s) 230 and does not share the same hydrogen flow path as the evaporator 212.

For implementations that include both the oil cooler 226 and the auxiliary component(s) 230 as separate parts of the system 200 such as in FIG. 2, the oil cooler 226 may be positioned downstream from the auxiliary component(s) 230. In other implementations, the oil cooler 226 may be positioned upstream from the auxiliary component(s) 230. In such other implementations, the cooling capacity of the hydrogen may be entirely, or close to entirely, used up after passing through the oil cooler 226, such that there is little to no cooling capacity left in the hydrogen as it passes through the auxiliary component(s) 230. By positioning the oil cooler 226 downstream from the auxiliary component(s) 230, and further downstream from the second connector 232 so that gaseous hydrogen from both the evaporator 212 and the auxiliary component(s) 230 is supplied to the oil cooler 226, the cooling capacity of the hydrogen to cool the auxiliary component(s) 230 and the engine oil in the oil cooler 226 may be optimized.

In addition or alternatively, in some implementations, the first pump 210 may pump liquid hydrogen directly to one or more locations downstream from the evaporator 212 and/or the auxiliary component(s) 230. In doing so, at least a portion of the liquid hydrogen output from the first pump 210 is not used for cooling the heat source 206 and/or the auxiliary component(s) 230. This may allow engine fuel flow demands of the engine 204 to not be limited by cooling needs of the heat source 206 and/or the auxiliary component(s) 230.

In some implementations, the one or more downstream locations directly receiving liquid hydrogen includes the second connector 232, where liquid hydrogen may be mixed or combined with gaseous hydrogen from the evaporator 212 and/or the from auxiliary component(s) 230. For example, the second connector 232 may be used to combine the liquid hydrogen with the gaseous hydrogen from the evaporator 212 and/or from the auxiliary component(s) 230. For some of these implementations, at least some liquid hydrogen in the second connector 232 may undergo a phase change to gas. In this way, the second connector 232 may function or serve as another evaporator in the system 200. In other implementations, the second connector 232 does not function as an evaporator, and instead passes the liquid hydrogen along with the gaseous hydrogen to one or more downstream components, such as the oil cooler 226, where the liquid hydrogen is converted to gaseous hydrogen.

In addition, in some implementations such as in FIG. 2, the one or more downstream locations directly receiving liquid hydrogen includes the pre-burner 228, which in turn burns the liquid hydrogen, and the burnt hydrogen may be vented from the hydrogen fuel delivery system 202 via a ventilation system 238. The pre-burner 228, or a portion of the hydrogen fuel delivery system 202 between the pre-burner 228 and the engine 204, may be configured to switch between supplying hydrogen to the engine 204 and to the ventilation system 238 so that, at any of various times during operation, the pre-burner 228 can supply the burnt hydrogen to the ventilation system 238 instead of to the engine 204. Further details of the ventilation system 238 are described in further detail below. Also, other implementations, including those using a supply of pressurized air or oxygen, may supply the burnt hydrogen to the engine 204.

Additionally, in some implementations, a third connector 234 is used to distribute the liquid hydrogen from the first pump 210 to the various components receiving the liquid hydrogen. For example, as shown in FIG. 2, the third connector 234 distributes the liquid hydrogen from the first pump 210 to the evaporator 212, the pre-burner 228, the auxiliary component(s) 230, and the second connector 232.

Additionally, in some implementations such as in FIG. 2, the system 200 may include a filter 236 coupled to the first pump 210. The filter 236 may clean and remove contaminants from the liquid hydrogen pumped from the tank 208 before the liquid hydrogen is distributed or supplied to the evaporator 212, the pre-burner 228, the auxiliary component (s) 230, the second connector 232, and/or the third connector 234. For at least some implementations, the filter 236 may be a fine filter configured to filter out relatively fine particles or contaminants in the liquid hydrogen. Such a fine filter may be in contrast to a coarse filter (not shown) positioned between the tank 208 and the first pump 210 and configured to filter our relatively larger particles or contaminants. Positioning the filter 236 after the first pump 210, rather than before the first pump 210, may ensure sufficient pressure at the inlet of the first pump 210, in turn preventing the liquid hydrogen from undesirably changing to gas before passing through the first pump 210, and in turn preventing damage to the first pump 210. Other implementations of the system 200 may not include the filter 236.

As previously described, in some implementations, the system 200 may include a ventilation system 238 configured to vent at least some of the gaseous hydrogen out of the system 200 before the gaseous hydrogen is delivered to the engine 204 as fuel. In some implementations or situations, less than all of the gaseous hydrogen supplied by the first pump 210 may be desired to be delivered to the engine 204. For these implementations or situations, the ventilation system 238 may vent the portion of the gaseous hydrogen that is not desired to be delivered to the engine 204. FIG. 2 shows the ventilation system 238 implemented between the second connector 232 and the initial downstream component (e.g., the oil cooler 226). Other implementations may position the ventilation system 238 in other locations, such as after a downstream-most component (e.g., the pre-burner 228), in order to vent gaseous hydrogen before it reaches the engine 204.

In some implementations or situations, the engine 204 may not always run during the same time that the heat source 206 is desired to be cooled. For example, the engine 204 may be configured to enter into a standby mode or otherwise not run at certain time periods, which may overlap with times that the heat source 206 is desired to be cooled. As examples, the heat source 206 may be activated to operate during the period the engine 204 is in its standby mode, or cooling (e.g., a relatively low level of cooling) may be needed to maintain the heat source 206 within a certain temperature range while the heat source 206 is not operating. In event that the heat source 206 is desired to be cooled but the engine 204 is not running, the first pump 210 (or a different pump (not shown)) may be activated to pump liquid hydrogen out of the tank 208 and deliver it to the evaporator 212 in order to cool the heat source 206. After leaving the evaporator 212, the gaseous hydrogen may be routed to the ventilation system 238 where it exits the system 200, instead of being supplied to the engine 204 while the engine 204 is not operating.

In addition or alternatively, in some implementations, even if the engine 204 is running, at least some of the gaseous hydrogen may be vented through the ventilation system 238 instead of being supplied to the engine 204. For example, in some implementations, cooling demands for the heat source 206 may be greater than the fueling demands for the engine 204, such that it may not be desirable for all of the liquid hydrogen converted to gas to be supplied to the engine 204 for combustion. In such implementations, some portion of the gaseous hydrogen may be supplied to the engine 204 for combustion, while another portion of the gaseous hydrogen may be vented through the ventilation system 238. Although not shown, a three-way valve or other suitable components may be used to concurrently or alternatingly supply the gaseous hydrogen to the engine 204 and the ventilation system 238.

Additionally, in some implementations, the system 200 may include, or otherwise be thermally coupled to, a first auxiliary cooling system 240. As previously described, in some implementations, the engine 204 may not always run during the time that the heat source 206 is desired to be cooled. For example, in some implementations, the engine 204 may be configured to enter into a standby mode, during which time the engine 204 does not burn fuel to operate. During this time of when the engine 204 is not running, the first auxiliary cooling system 240 may be utilized to keep the heat source 206 sufficiently cooled until the engine 204 starts running again. Other implementations may utilize the first auxiliary cooling system 240 even during periods that the engine 204 is running and liquid hydrogen is flowing to the evaporator 212.

The first auxiliary cooling system 240 may be implemented in any of various ways to be involved or uninvolved in cooling the heat source 206. In some implementations such as shown in FIG. 2, the first auxiliary cooling system 240 may be thermally coupled to the coolant loop 216, and be configured to remove heat from the coolant. Heat transferred from the heat source 206 to the coolant in the coolant loop 216 is then transferred to the first auxiliary cooling system 240 to cool the coolant. In other implementations, the first auxiliary cooling system 240 may cool the heat source 206 directly, as opposed to removing heat from the coolant. In addition or alternatively, in some implementations, the first auxiliary cooling system 240 is a cooling system of a vehicle, such as a vehicle in which the system 200 may be implemented. In other implementations, the first auxiliary cooling system 240 may include a phase change heat exchanger and/or one or more other components or structures with high thermal mass that, in turn, provide thermal inertia to enhance the ability of the heat source 206 and/or the coolant in the coolant loop 216 to resist temperature change, such as when the engine 204 is turned off and the first pump 210 is not pumping liquid hydrogen into the evaporator 212. In still other implementations, a thermal lift system may be used as the first auxiliary cooling system 240. In other implementations, the first auxiliary cooling system 240 may include a fan, a coolant line, and/or a ventilation system to move the heat away from the heat source 206. Other configurations of the first auxiliary cooling system 240 may be possible.

In addition, in some implementations, the system 200 may include, or otherwise be thermally coupled to, a second auxiliary cooling system 241. Similar to the first auxiliary cooling system 240, the second auxiliary cooling system 241 may keep the auxiliary component(s) 230 sufficiently cool during one or more time periods that the engine 204 is not running and/or until the engine 204 starts running again.

However, as with the first auxiliary cooling system 240, other implementations may utilize the second auxiliary cooling system 241 even during periods that the engine 204 is running and liquid hydrogen is flowing to the auxiliary component(s) 230. The second auxiliary cooling system 241 may have the same or a similar configuration as the first auxiliary cooling system 240. In some implementations, the first and second auxiliary cooling systems 240, 241 are the same or integral components of the same auxiliary cooling system, and/or are configured to operate together or in synchronization with each other. In other implementations, the first and second auxiliary cooling systems 240, 241 are configured as separate auxiliary cooling systems and/or are configured to operate independent of each other. Various ways of implementing one or more auxiliary cooling systems to provide auxiliary cooling capability for the heat source 206 and/or for the auxiliary component(s) 230 may be possible.

For at least some implementations, when the engine 204 is not running, transient capabilities within the system 200, such as within the hydrogen fuel delivery system 202, may still be able to sufficiently cool the heat source 206 for a certain period of time. In event that the time that the engine 204 is off is greater than the time that the transient capabilities can keep the heat source 206 sufficiently cool, the system 200 may still pump the liquid hydrogen to the evaporator 212 and vent the gaseous hydrogen through the ventilation system 238, and/or may utilize the first auxiliary cooling system 240 in order to keep the heat source 206 sufficiently cool for the remainder of the time that the engine 204 is not running. In any of various implementations, the system 200 may include all of the ventilation system 238, the first auxiliary cooling system 240, and the second auxiliary cooling system 241, or at least one and less than all of the ventilation system 238, the first auxiliary cooling system 240, and the second auxiliary cooling system 241. Still other implementations may not include any of the ventilation system 238, the first auxiliary cooling system 240, and the second auxiliary cooling system 241.

Additionally, in some implementations, the system 200 may include a controller 242, such as a full authority digital engine control (FADEC), that controls operation of the engine 204, operation of one or more other components of the system 200, and/or flow of the hydrogen through the hydrogen fuel delivery system 202. For example, the controller 242 may set a total engine fuel flow of the hydrogen fuel delivery system 202. The controller 242 may control or otherwise communicate with the first pump 210 and/or one or more other components in the system 200 in order to ensure that the total engine fuel flow is met. In addition or alternatively, the controller 242 may set a target temperature, a target pressure, and/or a target flow rate of the hydrogen at one or more locations in the hydrogen fuel delivery system 202, and/or may be configured to control one or more of the components in the system 200, such as the first pump 210, to ensure that the target pressure, target temperature, and/or target flow rate is met.

In addition or alternatively, the controller 242 may be configured to control the ventilation system 238 and/or the amount of hydrogen that is supplied to the engine 204 and vented by the ventilation system 238 at any given point in time. For example, when the engine 204 is running, the controller 242 may control the hydrogen fuel delivery system 202 so that all of the gaseous hydrogen is supplied to the engine 204, and none is vented through the ventilation system 238. Additionally, when the engine 204 is not running, the controller 242 may control the hydrogen fuel delivery system 202 so that all of the gaseous hydrogen is vented through the ventilation system 238 and none is delivered to the engine 204. In addition or alternatively, even if the engine 204 is running, the controller 242 may control the hydrogen fuel delivery system 202 to control how much of the hydrogen is supplied to the engine 204 and how much is vented according to the cooling and fuel demands in the system 200.

In addition or alternatively, the controller 242 may be configured to control whether the first auxiliary cooling system 240 is involved or uninvolved to cool the heat source 206 and/or whether the second auxiliary cooling system 241 is involved or uninvolved to cool the auxiliary component(s) 230. For example, when the engine 204 is running and the first pump 210 is pumping liquid hydrogen to the evaporator 212, the controller 242 may control the flow of the coolant in the coolant loop 216 so that it is not diverted to the first auxiliary cooling system 240, or may control the first auxiliary cooling system 240 and/or the second auxiliary cooling system 241 to be deactivated so that it does not operate to remove heat from the coolant in the coolant loop 216 or otherwise to cool the heat source 206. Additionally, when the engine 204 is not running, the controller 242 may control the flow of the coolant in the coolant loop 216 to be diverted to the first auxiliary cooling system 240 to cool the coolant, or may control the first auxiliary cooling system 240 to be activated so that it operates to remove heat from the coolant in the coolant loop 216 or otherwise to cool the heat source 206.

Figure 3:
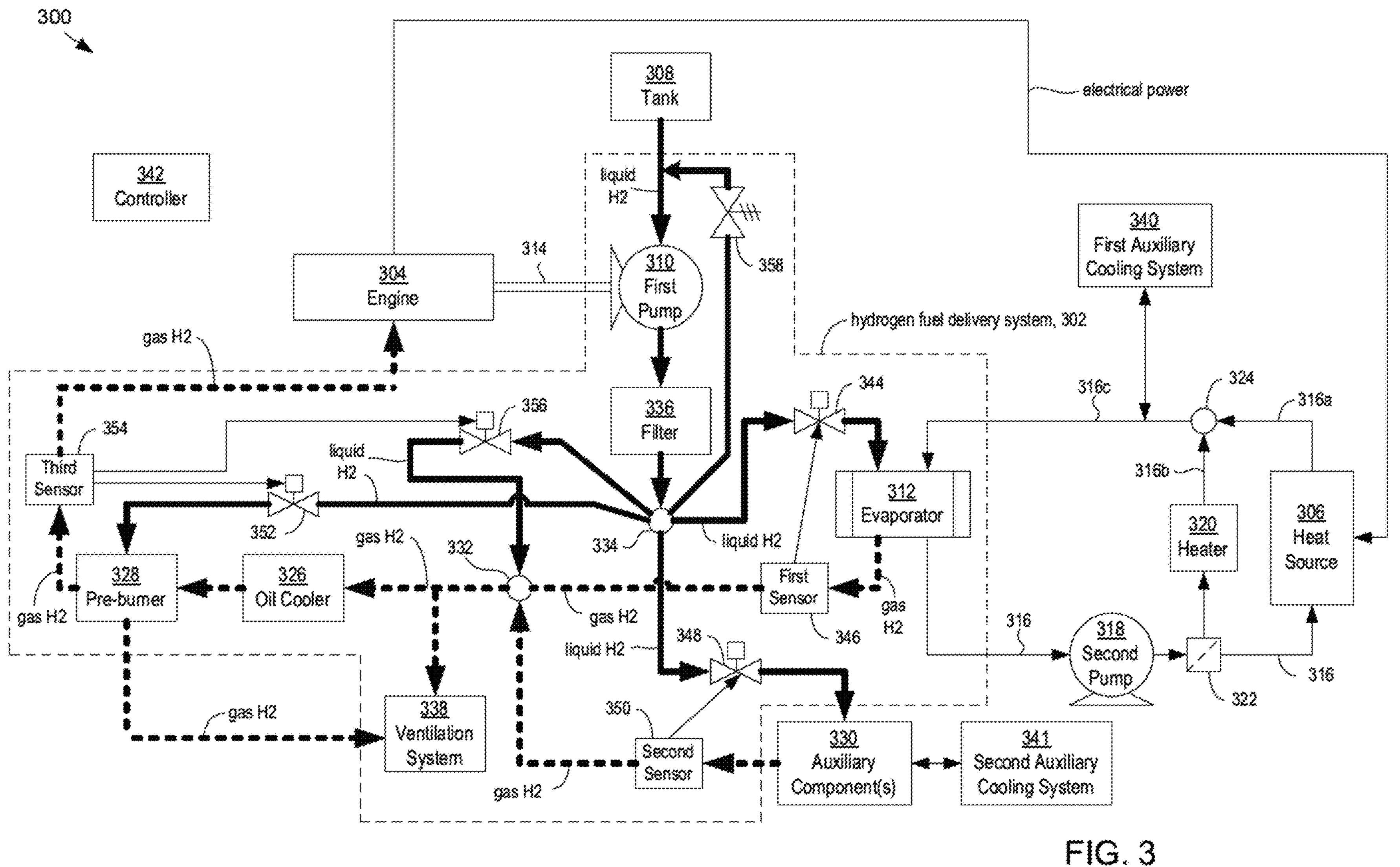
FIG. 3 is a schematic block diagram of another example system implementing a hydrogen fuel delivery system for an engine that is also configured to cool a heat source.

FIG. 3 shows another example system 300 that includes a hydrogen fuel delivery system 302 for an engine 304 that also functions as a cooling system for a heat source 306. The system 300 of FIG. 3 is similar to the system 200 in FIG. 2, in that the engine 304 may use hydrogen as fuel, similar to the engine 204. Additionally, the heat source 306 may be configured the same as or similar to the heat source 206, or otherwise have any of the various configurations as previously described for the heat source 206 of FIG. 2.

Additionally, similar to the system 200, the hydrogen fuel delivery system 302 includes a first pump 310 that pumps liquid hydrogen stored in a tank 308 to an evaporator 312. The evaporator 312 may convert at least some of the liquid hydrogen to gaseous hydrogen, and supply the gaseous hydrogen to the engine 304. In some implementations, the first pump 310 may be powered by the engine 304, such as via a rotatable shaft 314 or by supply of electrical power, such as via a generator.

Additionally, similar to FIG. 2, bold arrows are used in FIG. 3 to highlight the flow of hydrogen through the hydrogen fuel delivery system 302. Solid bold arrows are used to show parts of the flow path in the hydrogen fuel delivery system 302 where the hydrogen is in its liquid state or at least before it has passed through a component (e.g., the evaporator 312) where it is intended to perform a phase change to gas. Also, dotted bold arrows are used to show parts of the flow path of the hydrogen fuel delivery system 302 where the hydrogen is in its gaseous state or at least after it has passed through a component (e.g., the evaporator 312) where it is intended to perform a phase change to gas.

In addition, similar to the system 200, the system 300 may include a coolant loop 316 having a second pump 318 that circulates a coolant, separate from the liquid hydrogen fuel, to cool the heat source 306. Like the system 200, the liquid hydrogen in the hydrogen fuel delivery system 302 serves as an indirect heat sink, in that heat from the heat source 306 is first transferred to the coolant, and then transferred to the liquid hydrogen in the hydrogen fuel delivery system 302, such as in the evaporator 312. In some implementations, a heater 320 is configured in parallel with the heat source 306, and may heat the coolant in order to accelerate the ability of the heat source 306 to heat up to a target operating temperature. A three-way valve 322 or other similar component may alternatingly or concurrently route the coolant from the second pump 318 to the heat source 306 and the heater 320. Additionally, a first connector 324 may couple parts 316*a*, 316*b* of the coolant loop 316 extending from outputs of the heat source 306 and the heater 320, respectively, to a single path 316*c* supplying the coolant to the evaporator 312.

Additionally, in some implementations, the system 300 may include one or more components positioned downstream from the evaporator 312 and configured to further heat or raise the temperature of the gaseous hydrogen, similar to the system 200. The one or more downstream components may include an oil cooler 326 and/or a pre-burner 328, each of which may be configured similarly or the same as the oil cooler 226 and/or the pre-burner 228 of FIG. 2, respectively.

In addition, similar to the system 200, liquid hydrogen may also be supplied to one or more auxiliary components 330, which may be cooled by the liquid hydrogen and/or may cause at least some of the liquid hydrogen to change to a gaseous state. A second connector 332 may combine or mix together the gaseous hydrogen from the evaporator 312 and the auxiliary components 330, and supply the mixed gaseous hydrogen toward the engine 304, such as to the oil cooler 326. In some implementations, a third connector 334 may distribute the liquid hydrogen to the evaporator 312 and one or more other components, such as the auxiliary component(s) 330, the pre-burner 328, and/or the second connector 332, similar to the system 200.

Additionally, similar to the system 200, in some implementations, the system 300 may include a filter 336 configured to filter out contaminants or particles, including fine particles or contaminants, from the liquid hydrogen before it is delivered to the evaporator 312 and/or the other components configured to receive the liquid hydrogen. Also, similar to the system 200, in some implementations, the system 300 may include a ventilation system 338 configured to vent at least a portion of the gaseous hydrogen from the system 300, instead of that portion being supplied to the engine 304 for combustion. For example, the ventilation system 338 may vent the gaseous hydrogen during time periods when the engine 304 is not running, but liquid hydrogen is still being delivered to the evaporator 312 to cool the heat source 306. Additionally, similar to the system 200, in some implementations, the system 300 may include or otherwise be coupled to a first auxiliary cooling system 340 configured to cool the heat source 306 and/or a second auxiliary cooling system 341 configured to cool the auxiliary component(s) 330, particularly during time periods when the engine 304 is not operating. Also, similar to the system 200, in some implementations, the system 300 may include a controller 342 configured to control operation of the engine 304, operation of one or more other components of the system 300, and/or flow of the hydrogen through the hydrogen fuel delivery system 302.

In contrast to the system 200, the system 300 may further include one or more valves and/or one or more sensors that sense, regulate and/or control temperature, pressure, and/or flow rate of the hydrogen through the hydrogen fuel delivery system 302. The sensed temperature, pressure, and/or flow rate sensed from the sensors may be used to control the flow of the hydrogen through the valves, which in turn may maintain and/or adjust the temperature, pressure, and/or flow rate of the hydrogen passing through the sensors. In any of various implementations, the valves and/or sensors may be part of a fuel pump and metering unit (FPMU) (not shown), along with the first pump 310.

In further detail, in some implementations, the system 300 may include a first metering valve 344 configured to regulate the flow of liquid hydrogen from the first pump 310 to the evaporator 312. In addition or alternatively, in some implementations, the system 300 may include a first sensor 346 configured to sense at least one of a pressure and a temperature of the gaseous hydrogen output from the evaporator 312. As shown in FIG. 3, the pressure and/or temperature that the first sensor 346 senses may be used to control the flow of the liquid hydrogen through the first metering valve 344 and into the evaporator 312. In this way, the first sensor 346 provides feedback to the first metering valve 344 to maintain or adjust (increase or decrease) the flow rate of the liquid hydrogen flowing into the evaporator 312 to, in turn, maintain or adjust (increase or decrease) the pressure and/or temperature of the gaseous hydrogen exiting the evaporator 312.

In addition or alternatively, in some implementations, the system 300 may include a second metering valve 348 configured to regulate the flow of liquid hydrogen from the first pump 310 to the auxiliary component(s) 330. In addition or alternatively, the system 300 may include a second sensor 350 configured to sense at least one of a pressure and a temperature of the gaseous hydrogen output from the auxiliary component(s) 330 to control the flow of liquid hydrogen through the second metering valve 348 and to the auxiliary component(s) 330. In this way, the second sensor 350 provides feedback to the second metering valve 348 to maintain or adjust (increase or decrease) the flow rate of the liquid hydrogen flowing into the auxiliary component(s) 330 to, in turn, maintain or adjust (increase or decrease) the pressure and/or temperature of the gaseous hydrogen exiting the auxiliary component(s) 330.

As shown in FIG. 3, parallel flow paths for the liquid hydrogen are used to cool the heat source 306 and the auxiliary component(s) 330. Through the parallel flow paths, along with the first and second metering valves 344, 348 and sensors 346, 350, the heat source 306 and the auxiliary component(s) 330 can be cooled or otherwise have their temperatures controlled independent of each other. That is, the flow of the liquid hydrogen to the evaporator 312 and the flow of the liquid hydrogen to the auxiliary component(s) 330 can be independently controlled via the first and second metering valves 344, 348 and sensors 346, 350, which in turn provides independent or separate temperature control of the heat source 306 and the auxiliary component(s) 330.

In addition or alternatively, in some implementations, the system 300 may include a third metering valve 352 configured to regulate or control the flow of liquid hydrogen from the first pump 310 to the pre-burner 328. The third metering valve 352 may regulate or control the flow of the liquid hydrogen to the pre-burner 328 in order to ensure that the flow of hydrogen to the engine 304 is sufficiently in vapor form. A third sensor 354 may be positioned after the one or more components downstream from the evaporator 312 (e.g., after the pre-burner 328). The third sensor 354 may be configured to sense at least one of a pressure, a temperature, and a flow rate of gaseous hydrogen delivered to the engine 304. As shown in FIG. 3, the pressure, temperature, and/or flow rate that the third sensor 354 senses may be used to control the flow of the liquid hydrogen through the third metering valve 352. In this way, the third sensor 354 provides feedback to the third metering valve 352 to maintain or adjust (increase or decrease) the flow rate of the liquid hydrogen flowing into the pre-burner 328 to, in turn, maintain or adjust (increase or decrease) the pressure, temperature, and/or flow rate of the gaseous hydrogen entering into the engine 304 in order to ensure that the hydrogen flowing to the engine 304 is sufficiently in vapor form.

In addition or alternatively, in some implementations, the system 300 may include a fourth metering valve 356 configured to regulate or control the flow of liquid hydrogen from the first pump 310 to the second connector 332. The fourth metering valve 356 may regulate or control the flow of the liquid hydrogen to the second connector 332 in order to ensure a sufficient amount of hydrogen fuel is flowing to the engine 304. In some implementations such as in FIG. 3, the third sensor 354 is also configured to sense at least one of the pressure, the temperature, and the flow rate of gaseous hydrogen delivered to the engine 304 to control the flow of the liquid hydrogen through the third metering valve 356. In this way, the third sensor 354 provides feedback to the third metering valve 356 to maintain or adjust (increase or decrease) the flow rate of the liquid hydrogen flowing into the second connector 332 to, in turn, maintain or adjust (increase or decrease) the pressure, temperature, and/or flow rate of the gaseous hydrogen in order to ensure a sufficient or desired amount of hydrogen fuel is flowing to the engine 304.

In at least some implementations, the third sensor 354 may function to achieve or maintain a target pressure of the gaseous hydrogen input into the engine 304. The target pressure may be engine specific (i.e., may depend on the specific type of the engine 304), and/or may depend on the power settings of the engine 304, such as set by the controller 342. In some implementations, the target pressure is about 1,800 pounds per square inch gauge (psig), although other target pressure values are possible. In addition or alternatively, in some implementations, a target temperature of the gaseous hydrogen input into the engine 304 that the third sensor 354 may function to achieve or maintain may be in a range from ambient temperature levels to a highest temperature where the gaseous hydrogen is chemically stable. In particular of these implementations, the target temperature of the gaseous hydrogen input into the engine 304 may be greater than about 200 degrees Celsius (about 400 degrees Fahrenheit).

Additionally, the third and fourth metering valves 352, 356 and the third sensor 354 may provide control of the fuel flow and/or vapor state of the hydrogen fuel going into the engine 304 independent of the flow rate of the liquid hydrogen used to cool the heat source 306 and/or the auxiliary component(s) 330. In this way, in event that the fuel flow and/or vapor state of the hydrogen going into the engine 304 is desired to be adjusted (increased or decreased), the third and/or fourth metering valves 352, 356 can be controlled to adjust the flow rate of the liquid hydrogen going to the pre-burner 328 and/or to the second connector 332 in order to meet fuel demands, without or independent of adjusting the flow rate of the liquid hydrogen flowing to the evaporator 312 and/or to the auxiliary component(s) 330 for cooling.

In addition or alternatively, the fourth metering valve 356 may control the flow of the liquid hydrogen flowing into the second connector 332 to, in turn, control the cooling capacity of the hydrogen in the oil cooler 326. Since the second connector 332 is downstream from the evaporator 312 and/or the auxiliary component(s) 330, the cooling capacity of the hydrogen in the oil cooler 326 may be controlled through control of the hydrogen flowing into the second connector 332, without or independent of controlling the flow of the hydrogen to the evaporator 312 and/or the auxiliary component(s) 330. In this way, the cooling capacity of the hydrogen in the oil cooler 326 may be controlled independent of the cooling or temperature regulation of the heat source 306 and/or the auxiliary component(s) 330.

For at least some implementations, the controller 342 may additionally or alternatively be used to control the flow of the hydrogen through the hydrogen fuel delivery system 302, such as by controlling one or more of the metering valves 344, 348, 352, 356, one or more of the sensors 346, 350, 354, or other components of the system 300, such as the first pump 310 for example. In addition or alternatively, the controller 342 may set or demand a total fuel flow of the hydrogen through the hydrogen fuel delivery system 302. The metering valves 344, 348, 352, 356 and/or the sensors 346, 350, 354 may be operated, such as by being controlled by the controller 342, to ensure that the total fuel flow set by the controller 342 is achieved. In addition or alternatively, as previously described with respect to the system 200 of FIG. 2, the controller 342 may set a target temperature, a target pressure, and/or a target flow rate of the hydrogen through one or more locations in the hydrogen fuel delivery system 302. The metering valves and sensors 344-356 may be configured to be controlled or operate according to the target pressure, temperature, and/or flow rate set by the controller 342 so that the target pressure, temperature, and/or flow rate of the hydrogen through the hydrogen fuel delivery system 302 is maintained.

Also, in some implementations such as in FIG. 3, the system 300 may include a spill valve (or check valve or relief valve) 358 coupled between the third connector 334 and the inlet of the first pump 310. The spill valve 358 may provide spillage, overflow, or otherwise an excess amount of the liquid hydrogen output from the first pump 310 back to the input of first pump 310 for recirculation.

Figure 4:
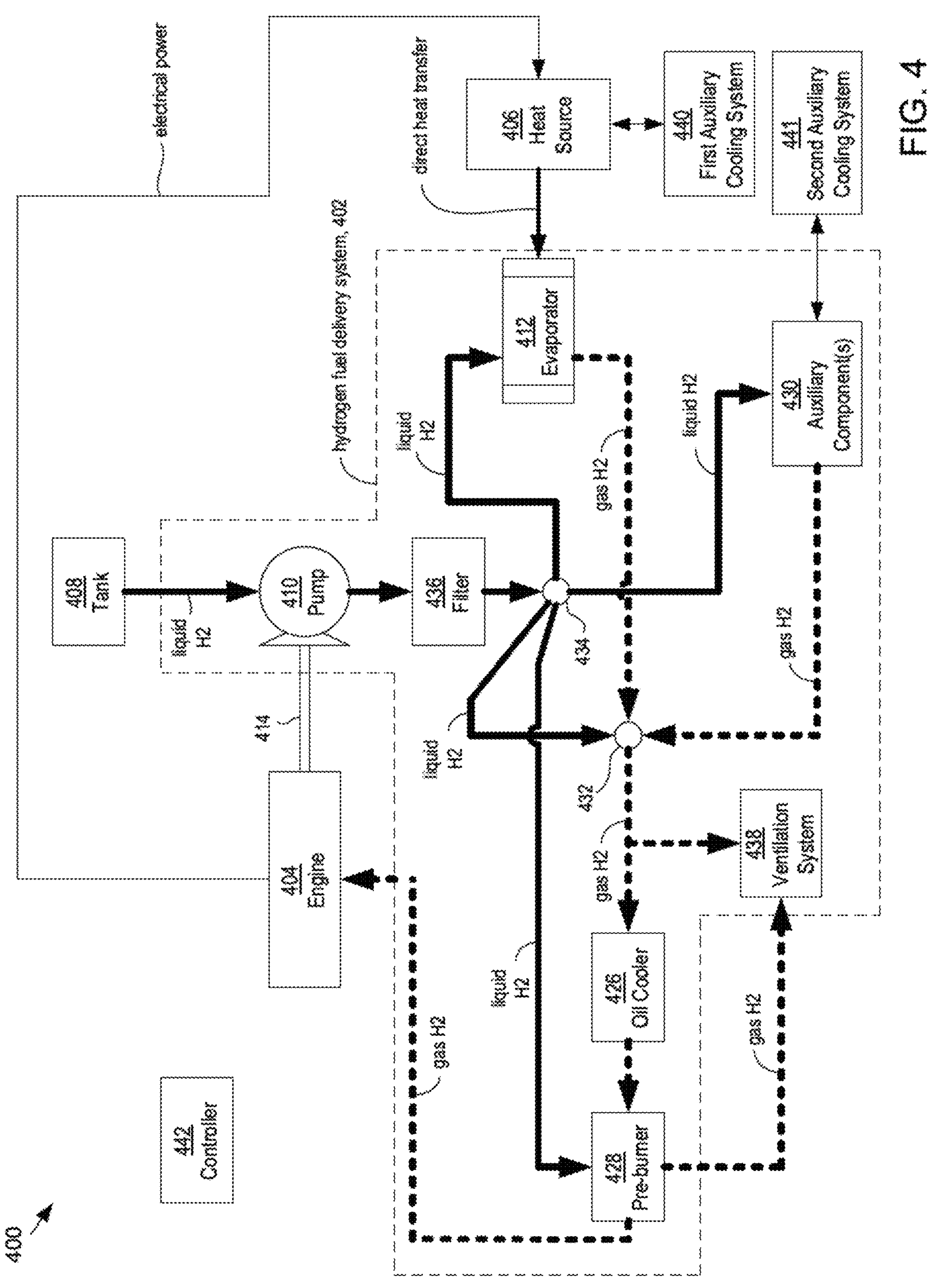
FIG. 4 is a schematic block diagram of another example system implementing a hydrogen fuel delivery system for an engine that is also configured to cool a heat source.

FIG. 4 shows another alternative system 400 that includes a hydrogen fuel delivery system 402 for an engine 404 that also functions as a cooling system for a heat source 406. The system 400 of FIG. 4 is similar to the systems 200 and 300, in that the engine 404 may use hydrogen as fuel, similar to the engines 204 and 304. Additionally, the heat source 406 may be configured the same as or similar to the heat source 206 or 306, or otherwise have any of the various configurations as previously described for the heat source 206 or 306 of FIG. 2 or 3.

Additionally, similar to the systems 200 and 300, the hydrogen fuel delivery system 402 includes a pump 410 that pumps liquid hydrogen stored in a tank 408 to an evaporator 412 that converts at least some of the liquid hydrogen to gaseous hydrogen, and supplies the gaseous hydrogen to the engine 404. In some implementations, the pump 410 may be powered by the engine 404, such as via a rotatable shaft 414 or by supply of electrical power via a generator.

Additionally, similar to FIGS. 2 and 3, bold arrows are used in FIG. 4 to highlight the flow of hydrogen through the hydrogen fuel delivery system 402. Solid bold arrows are used to show parts of the flow path in the hydrogen fuel delivery system 402 where the hydrogen is in its liquid state or at least before it has passed through a component (e.g., the evaporator 412) where it is intended to perform a phase change to gas. Also, dotted bold arrows are used to show parts of the flow path of the hydrogen fuel delivery system 402 where the hydrogen is in its gaseous state or at least after it has passed through a component (e.g., the evaporator 412) where it is intended to perform a phase change to gas.

In some implementations, the system 400 may include one or more components positioned downstream from the evaporator 412, such as an oil cooler 426 and/or a pre-burner 428, configured to further heat or raise the temperature of the gaseous hydrogen, similar to the systems 200 and 300.

In addition, in some implementations, similar to the systems 200 and 300, liquid hydrogen may also be supplied to one or more auxiliary components 430, which may be cooled by the liquid hydrogen and/or may cause at least some of the liquid hydrogen to change to gas. A second connector 432 may combine or mix together the gaseous hydrogen from the evaporator 412 and the auxiliary component(s) 430, and supply the mixed gaseous hydrogen toward the engine 404, such as to the oil cooler 426. In some implementations, a third connector 434 may distribute the liquid hydrogen to the evaporator 412 and one or more other components, such as the auxiliary component(s) 430, the pre-burner 428, and/or the second connector 432, similar to the systems 200 and 300.

Additionally, similar to the systems 200 and 300, in some implementations, the system 400 may include a filter 436 configured to filter out contaminants or particles, including fine particles or contaminants, from the liquid hydrogen before it is delivered to the evaporator 412 and/or the other components configured to receive the liquid hydrogen. Also, similar to the systems 200 and 300, in some implementations, the system 300 may include a ventilation system 438 configured to vent at least a portion of the gaseous hydrogen from the system 400, instead of that portion being supplied to the engine 404 for combustion. For example, the ventilation system 438 may vent the gaseous hydrogen during time periods when the engine 404 is not running, but liquid hydrogen is still being delivered to the evaporator 412 to cool the heat source 406. Additionally, similar to the systems 200 and 300, in some implementations, the system 400 may include or otherwise be coupled to a first auxiliary cooling system 440 configured to cool the heat source 406 and/or a second auxiliary cooling system 441 configured to cool the auxiliary component(s) 330, particularly during time periods when the engine 404 is not operating.

However, in contrast to the systems 200 and 300, where the liquid hydrogen functions as an indirect heat sink or coolant, the liquid hydrogen in the hydrogen fuel delivery system 402 functions as a direct heat sink or coolant for the heat source 406. As shown in FIG. 4, the liquid hydrogen may function as a direct heat sink in that heat from the heat source 406 is directly transferred or absorbed by the liquid hydrogen, without first being transferred to a separate coolant. For example, unlike the systems 200 and 300, which uses a coolant loop 216, 316 to thermally couple respective heat sources 206, 306 to respective evaporators 212, 312, the system 400 in FIG. 4 does not similarly have such a coolant loop.

For at least some implementations, the evaporator 412 is positioned in close enough proximity to the heat source 406 such that the heat from the heat source 406 directly heats the liquid hydrogen without first heating a separate coolant. For example, the evaporator 412 may be in thermal contact with the heat source 406, such that the evaporator 412 functions as a heat load or heat exchanger (e.g., a cold plate) for the heat source 406. As a particular example, the heat source 406 includes electronic circuitry that is mounted or attached to, or is otherwise in direct thermal contact with, the evaporator 412, such that the evaporator 412 is or functions as a cold plate or other heat exchanger for the electronic circuitry. In this way, heat generated by the electronic circuitry is transferred from the electronic circuitry to the liquid hydrogen via the evaporator 412.

Additionally, since the system 400 in FIG. 4 does not utilize a coolant loop particularly designated for the heat source 406, the first auxiliary cooling system 440 may be configured to cool the heat source 406 directly, as opposed to indirectly via a coolant loop. For example, the first auxiliary cooling system 440 may include a fan to move the heat away from the heat source 406, or the first auxiliary system 440 may include its own coolant line and/or a heat exchanger to which the heat source 406 is directly attached and/or to which heat generated by the heat source 406 is transferred.

Other implementations of the system 400 may be possible. For example, another alternative implementation of the system 400 may include one or more metering valves configured to regulate the flow of liquid hydrogen to the evaporator 412, the auxiliary component(s) 430, the pre-burner 428, and/or the second connector 432, similar to the system 300 of FIG. 3. In addition or alternatively, other implementations of the system 400 may include one or more sensors configured to sense at least one of a temperature, a pressure, and a flow rate of gaseous hydrogen output from one or more of the evaporator 412, the auxiliary component(s) 430, and the downstream component(s) (e.g., the oil cooler 426 ad/or the pre-burner 428) in order to control one or metering valves in the system 400. In addition or alternatively, other implementations of the system 400 may include a spill valve configured to pass overflow of the liquid hydrogen after the pump 410 back into circulation at the inlet of the pump 410.

Various implementations of the systems 200, 300, and/or 400 other than shown in FIGS. 2-4 are possible, including those having fewer or more components than the components shown in FIGS. 2-4. For example, various implementations of the systems 200, 300, and/or 400 may include only the hydrogen fuel delivery system 202, 302, and/or 402 and the heat source 206, 306, and/or 406, without necessarily including the engine 204, 304, and/or 404 and/or the tank 208, 308, and/or 408. In addition or alternatively, some implementations may not cool auxiliary component(s) 230, 330, 430 using the hydrogen. In addition or alternatively, some implementations may not include components downstream from the evaporator 212, 312, 412 and/or the auxiliary component(s) 230, 330, and/or 430 before the engine 204, 304, and/or 404. In addition or alternatively, some implementations may have the first pump 210, 310, and/or 410 pump liquid hydrogen only to the evaporator 212, 312, and/or 412, or only to the evaporator 212, 312, and/or 412 and the auxiliary component(s) 230, 330, and/or 430, but not to any downstream components. Various implementations of the systems 200, 300, and 400 are possible.

Figure 5:
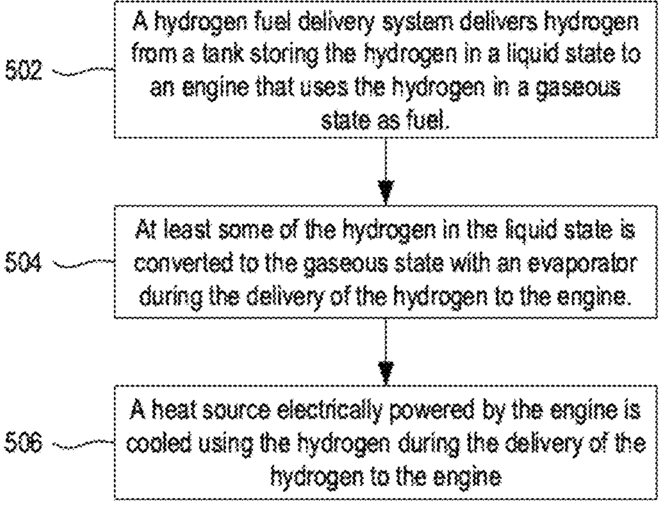
FIG. 5 is a flow chart of an example cooling method.

FIG. 5 a flow chart of an example cooling method 500. The method 500 may be performed with the components in FIGS. 2, 3 and/or 4. At block 502, a hydrogen fuel delivery system (e.g., the hydrogen fuel delivery system 202, 302, or 402) may deliver hydrogen from a tank (e.g., the tank 208, 308, or 408) storing the hydrogen in a liquid state to an engine (e.g., the engine 204, 304, or 404) that uses the hydrogen in a gaseous state as fuel. At block 504, at least some of the hydrogen in the liquid state may be converted to the gaseous state with an evaporator (e.g., the evaporator 212, 312, or 412) during the delivery of the hydrogen to the engine. At block 506, a heat source (e.g., the heat source 206, 306, or 406) may be cooled using the hydrogen during the delivery of the hydrogen to the engine. The heat source may be electrically powered by the engine when the engine is burning the hydrogen to operate. In any of various implementations of the example method 500, the actions performed in the method 500 may be, but are not necessarily, performed in the order shown in the flow chart of FIG. 5. For example, in any of various implementations, two or more of the actions of the method 500 may be performed concurrently or in orders different than what is shown in the flow chart of FIG. 5. Other methods are possible, including those having fewer, additional, or different actions from those in FIG. 5, including methods that incorporate any of the actions performed with any of the components described above with respect to FIGS. 1-4.

An interesting feature of the embodiments described herein is that engine performance may be improved, such by improving the thermodynamic cycle of the engine. For example, by absorbing the heat from the heat source 206, 306, and/or 406 the hydrogen entering into the engine 204, 304, and/or 404 is hotter than it otherwise would be if the heat is not absorbed, which translates to a larger amount of work output from the engine 204, 304, and/or 404. Alternatively, engine efficiency may be improved since increasing the temperature of the hydrogen fuel may allow the flow rate of the hydrogen fuel to be decreased without correspondingly lowering the amount of work output from the engine 204, 304, and/or 404. In addition or alternatively, by heating the hydrogen in the hydrogen fuel delivery system 202, 302, and/or 402 before the hydrogen reaches the engine 204, 304, and/or 404, there is inherently less heating that the engine 204, 304, and/or 404, and/or the pre-burner 228, 328, 428 has to do in order for the hydrogen to reach a desired temperature for combustion.

Another interesting feature of the embodiments described herein is that the number of components and/or connections used to cool the heat source 206, 306, and/or 406 may be significantly reduced compared to other cooling systems, including those that reject heat to air. For example, by leveraging the hydrogen in the hydrogen fuel delivery system 202, 302, and/or 402 as a heat sink, most of the components used in a conventional refrigerant system, such as a compressor, a gas cooler, a recuperator, a separate evaporator, and/or a fan, among others, may not be needed in order to still sufficiently cool the heat source 206, 306, and/or 406, as exemplified in the systems 200, 300, and/or 400. The reduction in cooling components desirably results in reduced weight, size, power consumption, and cost. The elimination of such cooling components may also desirably eliminate or minimize system vibration, as these components that can be eliminated are generally significant sources of the system vibration. Such reduction in system vibration may be especially beneficial for applications where vibration has a significantly negative impact on the performance of the heat source 206, 306, and/or 406. For example, removing or reducing system vibration may significantly improve the performance of a laser system, since such removal or reduction in system vibration may significantly enhance the laser system's ability to achieve maximum laser intensity on an intended target.

Another interesting feature of the embodiments described herein is that the hydrogen fuel delivery systems 202, 302, and/or 402 provide a significantly larger cooling capacity and more efficient cooling compared to other cooling systems that reject heat to ambient air. This is due, at least in part, to the liquid hydrogen being at a much colder temperature than ambient air. As mentioned, hydrogen is generally liquefied at temperatures below −253 degrees Celsius, much colder than ambient air, which is generally from around 0 degrees Celsius in cold climates to 30 degrees Celsius and above in hotter climates. The much colder temperature of the liquid hydrogen compared to ambient air provides, in turn, much larger temperature differentials between the liquid hydrogen and the heat from the heat source 206, 306, and/or 406, leading to better cooling performance and efficiency provided by the hydrogen fuel delivery systems 202, 302, and/or 402.

An additional interesting feature is that the embodiments described herein directly link the powering with the cooling of the heat source 206, 306, and/or 406, which in turn provides improved cooling performance and capacity compared to other cooling systems that reject heat to ambient air. As previously described, the engine 204, 304, and/or 404 may be used to electrically power the heat source 206, 306, and/or 406. In turn, the power demands of the heat source 206, 306, and/or 406 may dictate the engine power settings, which in turn dictates the fuel flow rate of the hydrogen fuel, which in turn directly corresponds to the cooling capacity of the hydrogen. In this way, the cooling capacity that the hydrogen provides to the heat source 206, 306, and/or 406 is directly linked to the power demands of the heat source 206, 306, and/or 406, providing enhanced cooling capacity and performance compared to other cooling systems that reject heat to ambient air, as those other cooling systems do not similarly provide a linkage between the cooling ability of the ambient air and the power demands of the heat source 206, 306, and/or 406.

Another interesting feature of the embodiments described herein is that the hydrogen heat sink is temperature independent, meaning that the temperature of the liquid hydrogen is not influenced or affected by the temperature of the ambient environment. The liquid hydrogen coming out of the tank 208, 308, and/or 408 and/or entering into the first pump 210, 310, and/or 410 is always at about the same temperature, such as around −253 degrees Celsius (20 degrees Kelvin), irrespective of the temperature of the ambient environment. In this way, the cooling capacity and performance of the system 200, 300, and/or 400 is generally the same, irrespective of whether the system 200, 300, and/or 400 is operating in a generally cold climate or a generally hot climate, and/or irrespective of temperature fluctuations throughout a given day or over the course of a given week or month, and so forth. In contrast, the cooling performance of other cooling systems, including those that reject heat to ambient air, is significantly dependent on, or affected by, the temperature of the surrounding environment. As such, these other cooling systems experience significant degradation in cooling performance in hotter climates compared to colder climates, which is not similarly experienced by the systems 200, 300, and/or 400 due at least in part to the temperature independency of the liquid hydrogen.

Additionally, the embodiments described herein provide a cooling system with an effectively endless duty cycle, limited only by when the hydrogen fuel runs out. The duty cycle is not limited by or dependent on a compressor or a temperature of the ambient environment.

An additional interesting feature is that the embodiments described herein may improve the performance of a laser system, such as one that includes one or more laser diodes. As previously described, the heat source 206, 306, and/or 406 may include, or otherwise be thermally coupled to, a laser system. In general, a laser system may operate at relatively low temperatures when lasing, such as in a range of about 15-50 degrees Celsius, as a non-limiting example. In addition, a laser system may operate within a relatively small or tight target temperature range for optimal efficiency, such as a temperature range of 5 degrees Celsius. In the event that the temperature falls outside of the small temperature range, the laser system may experience significant degradation in efficiency, such as by generating significantly more heat. Moreover, a laser system may generate a significant amount of heat that needs to be removed so that the temperature of the laser system can be maintained within its tight target temperature range. For example, the laser system may need twice as much heat energy removed relative to the optical energy that the laser system outputs. The systems 200, 300, and/or 400, through use of the hydrogen fuel at extremely low temperatures (e.g., −253 degrees Celsius), provide a large temperature differential between the hydrogen fuel and the operating temperature of the laser system, and correspondingly, a sufficiently large cooling capacity to maintain the operating temperature within the relatively high, but tight, target operating temperature range. Due to the large temperature differential and cooling capacity, the systems 200, 300, and/or 400 allow such a laser system to operate more efficiently at its low, tight, target operating temperature compared to other cooling systems that reject heat to ambient air due and that have smaller temperature differentials and/or cooling capacity.

An additional or alternative way that the embodiments described herein may improve performance of a laser system is through heat removal and temperature regulation of the heat source 206, 306, and/or 406 when the laser system turns off and/or when the laser system is not operating. In general, a laser system operates intermittently, as opposed to continuously. The laser turns on (is activated) to emit laser light, and then turns off (is deactivated) to stop emitting laser light. The laser system may then be activated again to emit laser light, and the operation may repeat intermittently. When the laser system is turned on, it generates a significant amount of heat, as described. Additionally, when the laser system is deactivated but then turns on again, the laser system may need to ramp up to within its target operating temperature range by the end of a predetermined time period. If the laser system does not, then the laser system may operate inefficiently or may even become damaged or destroyed. The systems 200, 300, and/or 400 described herein, through use of the large cooling capacity provided by the liquid hydrogen, allow such a laser system to sufficiently dissipate the large amount of heat it generates. Additionally, the systems 200, 300, and/or 400 may regulate the laser system and/or its heat load to be within a target or desired temperature range when the laser system is off. The heat dissipation and temperature regulation that the systems 200, 300, and/or 400 provide may, in turn, allow the laser system to ramp up to its target operating temperature within the predetermined time period, as optimally desired. Other cooling systems, including those that reject heat to ambient air, may not be able to similarly remove the large amount of heat generated by a laser system as efficiently when the laser system turns off, and/or regulate the temperature of the heat load during the laser system's off time as tightly, and in turn may not allow a laser system to ramp up to within its target operating temperature range by the end of the predetermined time period as effectively or efficiently as the systems 200, 300, and/or 400 described herein.

Another way that the embodiments described herein may improve performance of a laser system is by enabling the laser system to be in the form of a superconducting or cryogenic laser system due to the cryogenic temperature of the liquid hydrogen. Superconducting or cryogenic laser systems generally generate significantly less heat, and in turn, may allow for a more intensive or powerful laser output and/or lower the required amount of cooling. Use of hydrogen fuel as a heat sink for a cryogenic laser system may allow for a cooling system that is much smaller compared to other cooling systems that reject heat to ambient air. Correspondingly, not only may use of the hydrogen fuel as a heat sink allow for cryogenic lasing, but may also allow for such a cryogenic laser system to be implemented in a mobile system, such as an aircraft or other vehicle, which may otherwise not be feasible with larger cooling systems, such as one that rejects heat to ambient air or uses other conventional refrigeration techniques.

An additional interesting feature is that the embodiments described herein may enable the use of power-dense superconducting generators and/or other electronics, which may be included in the auxiliary component(s) 230, 330, and/or 430. As mentioned, cryogenic laser systems may be enabled by leveraging the very cold temperatures of liquid hydrogen. In a similar way, the generator(s) and/or electronics, such as those making up the auxiliary component(s) 230, 330, and/or 430, may be implemented with superconducting technology by similarly leveraging the cold temperatures of the liquid hydrogen, providing the auxiliary component(s) 230, 330, and/or 430 with a configuration that generates significantly less heat than similar components operating at higher temperatures. A further interesting feature is that the embodiments described herein may enable the use of hydrogen as a zero-carbon hydrogen fuel with minimal size, weight and power (SWaP).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a system that includes a hydrogen fuel delivery system for an engine. The hydrogen fuel delivery system includes a pump configured to pump hydrogen from a tank storing the hydrogen in a liquid state through the hydrogen fuel delivery system, and an evaporator configured to convert at least some of the hydrogen in the liquid state to a gaseous state. The system also includes a heat source thermally coupled with the hydrogen fuel delivery system and fluidly uncoupled from the hydrogen fuel delivery system. The hydrogen fuel delivery system is configured to supply the hydrogen to the engine for combustion and cool the heat source using the hydrogen.

A second aspect includes the first aspect, and further includes wherein the hydrogen in the evaporator functions as an indirect heat sink for the heat source.

A third aspect includes the second aspect, and further includes a coolant loop configured to circulate a coolant between the heat source and the evaporator to cool the heat source, wherein heat from the heat source is transferred from the coolant to the hydrogen in the evaporator.

A fourth aspect includes the third aspect, and further includes wherein the pump includes a first pump, and wherein the coolant loop includes a second pump configured to pump the coolant between the evaporator and the heat source.

A fifth aspect includes any of the third or fourth aspects, and further includes wherein the coolant loop comprises a heater configured to heat the coolant.

A sixth aspect includes the first aspect, and further includes wherein the hydrogen in the evaporator functions as a direct heat sink for the heat source.

A seventh aspect includes any of the first through sixth aspects, and further includes at least one component positioned downstream from the evaporator and configured to raise a temperature of the hydrogen before the hydrogen reaches the engine.

An eighth aspect includes the seventh aspect, and further includes wherein the at least one component comprises at least one of an oil cooler and a preheater.

A ninth aspect includes any of the seventh or eighth aspects, and further includes wherein the pump is configured to deliver a portion of the hydrogen in the liquid state directly to the at least one component.

A tenth aspect includes the ninth aspect, and further includes at least one metering valve configured to regulate a flow of the portion of the hydrogen in the liquid state from the pump to the at least one component.

An eleventh aspect includes any of the first through tenth aspects, and further includes a metering valve configured to regulate a flow of the hydrogen in the liquid state to the evaporator.

A twelfth aspect includes the eleventh aspect, and further includes wherein the metering valve is controlled based on at least one of a sensed pressure and a sensed temperature of the hydrogen output from the evaporator.

A thirteenth aspect includes any of the first through twelfth aspects, and further includes wherein the pump is configured to pump a first portion of the hydrogen in the liquid state to the evaporator, and is further configured to pump a second portion of the hydrogen in the liquid state to at least one auxiliary component to cool the at least one auxiliary component.

A fourteenth aspect includes the thirteenth aspect, and further includes a connector configured to combine the first portion of the hydrogen from the evaporator and the second portion of the hydrogen from the at least one auxiliary component, and supply the first portion and the second portion downstream to the engine.

A fifteenth aspect includes any of the first through fourteenth aspects, and further includes a ventilation system configured to vent at least a portion of the hydrogen before the hydrogen reaches the engine.

A sixteenth aspect includes any of the first through fifteenth aspects, and further includes an auxiliary cooling system configured to cool the heat source when the engine is not operating.

A seventeenth aspect includes any of the first through sixteenth aspects, and further includes wherein the heat source includes electrical circuitry configured to be powered by the engine.

An eighteenth aspect includes a system that includes a heat source, an engine, and a hydrogen fuel delivery system. The heat source is configured to consume electrical power to operate. The engine is configured to supply the electrical power to the heat source and use hydrogen as fuel for combustion. The hydrogen fuel delivery system is configured to deliver the hydrogen to the engine and cool the heat source using the hydrogen as a heat sink.

A nineteenth aspect includes the eighteenth aspect, and further includes wherein the heat source includes a laser diode.

A twentieth aspect includes a hydrogen cooling method that includes: delivering, with a hydrogen fuel delivery system, hydrogen from a tank storing the hydrogen in a liquid state to an engine that uses the hydrogen in a gaseous state as fuel; converting at least some of the hydrogen in the liquid state to the gaseous state with an evaporator during the delivery of the hydrogen to the engine; and cooling a heat source using the hydrogen during the delivery of the hydrogen to the engine, the heat source electrically powered by the engine when the engine is burning the hydrogen to operate.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:

a hydrogen fuel delivery system for an engine, the hydrogen fuel delivery system comprising a pump configured to pump hydrogen from a tank storing the hydrogen in a liquid state through the hydrogen fuel delivery system, and an evaporator configured to convert at least some of the hydrogen in the liquid state to a gaseous state;

a heat source thermally coupled with the hydrogen fuel delivery system and fluidly uncoupled from the hydrogen fuel delivery system;

a first connector arranged downstream of the pump and configured to receive the hydrogen in the liquid state therefrom;

a further connector;

at least one component positioned downstream from the evaporator between the evaporator and the engine and configured to raise a temperature of the hydrogen before the hydrogen reaches the engine, and a coolant loop configured to circulate a coolant between the heat source and the evaporator to cool the heat source, wherein the coolant flows directly from the heat source to the evaporator, wherein heat from the heat source is transferred from the coolant to the hydrogen in the evaporator, wherein the coolant loop includes a first valve that splits the coolant flowing from the evaporator into a primary portion that flows to a heater and a secondary portion that flows to the heat source, and wherein the primary and secondary portions are directed to the evaporator after having passed through the heater and the heat source, respectively wherein the first connector splits the hydrogen in the liquid state into a first portion that flows to the at least one component and into a second portion that flows to the evaporator such that the first and second portions are configured to flow to the at least one component and the evaporator, respectively, simultaneously, wherein the first connector further splits the hydrogen in the liquid state into a third portion that flows to at least one auxiliary component to cool the at least one auxiliary component, and wherein the further connector is configured to combine a fourth portion of the hydrogen exiting the evaporator and a fifth portion of the hydrogen exiting the at least one auxiliary component and supply the fourth and fifth portions downstream to the engine, and wherein the hydrogen fuel delivery system is configured to supply the hydrogen to the engine for combustion and cool the heat source using the hydrogen.

2. The system of claim 1, wherein the coolant loop is configured such that the primary portion of the coolant that has been heated by the heater bypasses the heat source and flows directly to the evaporator and the coolant exiting the heat source bypasses the heater and flows directly to the heat source.

3. The system of claim 2, wherein the coolant loop further includes a first fluid line along which the evaporator and the heat source are arranged and a second fluid line along which the heater is arranged, and wherein the coolant loop further includes a third connector that fluidically couples the second fluid line to the first fluid line downstream of the heat source.

4. The system of claim 3, wherein the primary and secondary portions of the coolant flow through the third connector after exiting the heater and the heat source, respectively, such that the primary and secondary portions both flow through the first fluid line to the evaporator after passing through the third connector.

5. The system of claim 1, wherein the pump comprises a first pump, and wherein the coolant loop comprises a second pump configured to pump the coolant between the evaporator and the heat source.

6. The system of claim 1, further comprising:

a metering valve arranged between the pump and the evaporator and configured to regulate a flow of the hydrogen in the liquid state to the evaporator.

7. A system comprising:

a hydrogen fuel delivery system for an engine, the hydrogen fuel delivery system comprising a pump configured to pump hydrogen from a tank storing the hydrogen in a liquid state through the hydrogen fuel delivery system, and an evaporator configured to convert at least some of the hydrogen in the liquid state to a gaseous state;

a heat source thermally coupled with the hydrogen fuel delivery system and fluidly uncoupled from the hydrogen fuel delivery system;

a first connector arranged downstream of the pump and configured to receive the hydrogen in the liquid state therefrom;

a further connector; and at least one component positioned downstream from the evaporator between the evaporator and the engine and configured to raise a temperature of the hydrogen before the hydrogen reaches the engine, wherein the hydrogen fuel delivery system is configured to supply the hydrogen to the engine for combustion and cool the heat source using the hydrogen, and wherein the first connector splits the hydrogen in the liquid state into a first portion that flows to the at least one component and into a second portion that flows to the evaporator such that the first and second portions are configured to flow to the at least one component and the evaporator, respectively, simultaneously, wherein the first connector further splits the hydrogen in the liquid state into a third portion that flows to at least one auxiliary component to cool the at least one auxiliary component, and wherein the further connector is configured to combine a fourth portion of the hydrogen exiting the evaporator and a fifth portion of the hydrogen exiting the at least one auxiliary component and supply the fourth and fifth portions downstream to the engine.

8. The system of claim 7, wherein the at least one component comprises at least one of an oil cooler and a preheater.

9. The system of claim 7, wherein the pump is configured to deliver the first portion of the hydrogen in the liquid state directly to the at least one component.

10. The system of claim 7, further comprising:

a first metering valve arranged between the first connector and the evaporator and configured to regulate a flow of the hydrogen in the liquid state to the evaporator.

11. The system of claim 10, further comprising:

a second metering valve arranged between the first connector and the at least one component and configured to regulate a flow of the hydrogen in the liquid state to the at least one component.

12. The system of claim 10, wherein the first metering valve is controlled based on at least one of a sensed pressure and a sensed temperature of the hydrogen output from the evaporator.

13. A method, comprising:

delivering, with a pump of a hydrogen fuel delivery system, hydrogen from a tank storing the hydrogen in a liquid state to an engine that uses the hydrogen in a gaseous state as fuel;

converting at least some of the hydrogen in the liquid state to the gaseous state with an evaporator of the hydrogen fuel delivery system during the delivery of the hydrogen to the engine;

providing a heat source thermally coupled with the hydrogen fuel delivery system and fluidly uncoupled from the hydrogen fuel delivery system;

arranging a first connector downstream of the pump and configured to receive the hydrogen in the liquid state therefrom;

positioning at least one component downstream from the evaporator between the evaporator and the engine and configured to raise a temperature of the hydrogen before the hydrogen reaches the engine;

splitting the hydrogen in the liquid state via the first connector into a first portion that flows to the at least one component and into a second portion that flows to the evaporator such that the first and second portions are configured to flow to the at least one component and the evaporator, respectively, simultaneously, wherein the first connector is further configured to split the hydrogen in the liquid state into a third portion that flows to at least one auxiliary component to cool the at least one auxiliary component; and arranging a further connector such that the further connector is configured to combine a fourth portion of the hydrogen exiting the evaporator and a fifth portion of the hydrogen exiting the at least one auxiliary component and supply the fourth and fifth portions downstream to the engine, wherein the hydrogen fuel delivery system is configured to supply the hydrogen to the engine for combustion and cool the heat source using the hydrogen.

14. The method of claim 13, wherein the at least one component comprises at least one of an oil cooler and a preheater.

15. The method of claim 13, wherein the pump is configured to deliver the first portion of the hydrogen in the liquid state directly to the at least one component.

16. The method of claim 13, further comprising: splitting, via the first connector, the hydrogen in the liquid state into the third portion that flows to the at least one auxiliary component to cool the at least one auxiliary component.

17. The method of claim 13, further comprising:

arranging a first metering valve between the first connector and the evaporator that is configured to regulate a flow of the hydrogen in the liquid state to the evaporator.

18. The method of claim 17, further comprising:

arranging a second metering valve between the first connector and the at least one component that is configured to regulate a flow of the hydrogen in the liquid state to the at least one component.

* * * * *